United States Patent [19]

Hurst et al.

[11] 4,227,556
[45] Oct. 14, 1980

[54] METHOD AND APPARATUS FOR SLUSH MOLDING ARTICLES OF FOOTWEAR

[75] Inventors: Eric J. Hurst, Trenton; Hugh G. MacAulay, Batawa, both of Canada

[73] Assignee: Bata Shoe Company, Inc., Belcamp, Md.

[21] Appl. No.: 964,750

[22] Filed: Nov. 29, 1978

Related U.S. Application Data

[62] Division of Ser. No. 925,842, Jul. 18, 1978.

[30] Foreign Application Priority Data

Aug. 22, 1977 [CA] Canada .................................. 285219

[51] Int. Cl.³ .................................................. B29F 5/00
[52] U.S. Cl. .................................... 141/137; 141/135; 425/259; 425/449; 425/575
[58] Field of Search ............... 425/574, 575, 449, 259; 141/137, 135

[56] References Cited

U.S. PATENT DOCUMENTS

| 2,522,031 | 9/1950 | Gavin | 141/137 |
| 2,999,517 | 9/1961 | Cervinka | 141/137 |
| 3,880,562 | 4/1975 | Hujik | 425/449 |

FOREIGN PATENT DOCUMENTS 995866  8/1976  Canada .

Primary Examiner—James H. Derrington
Attorney, Agent, or Firm—Holman & Stern

[57] ABSTRACT

In a slush molding process for producing a boot or shoe from a plastisol, a mold in the shape of the article of footwear is filled with liquid plastisol, the mold is heated to form a skin, the mold is tilted to pour out excess plastisol, and, after filling the heel cavity of the mold, the skin and heel filler are cured or hardened, and the skin is removed from the mold and trimmed for further processing. Instead of filling the heel cavities of the molds with a specially formulated heel filling composition, the skin trimmings, which were previously discarded as waste, can be ground, if necessary, mixed with additional stabilizer and injected into the heel cavities using an injection unit. With the molds travelling along a straight line path of travel, it is necessary to cause the nozzle end of the injection unit to move in synchronism with the molds. For such purpose, the injection unit is mounted on a shaft which is rotated by a drive train connected to the conveyor chain carrying the molds or the drive of the conveyor chain. In order to cause the nozzle of the injection unit to follow the same straight line path of travel as the molds, the shaft and injection unit are mounted on a carriage slidable towards and away from the molds, and a cam device controls sliding of the injection unit so that the nozzle is maintained in position over a mold during each heel filling operation. By utilizing the waste material instead of a specially formulated heel filling material, the cost of producing the heel and consequently the cost of the article of footwear as a whole is substantially reduced.

5 Claims, 14 Drawing Figures

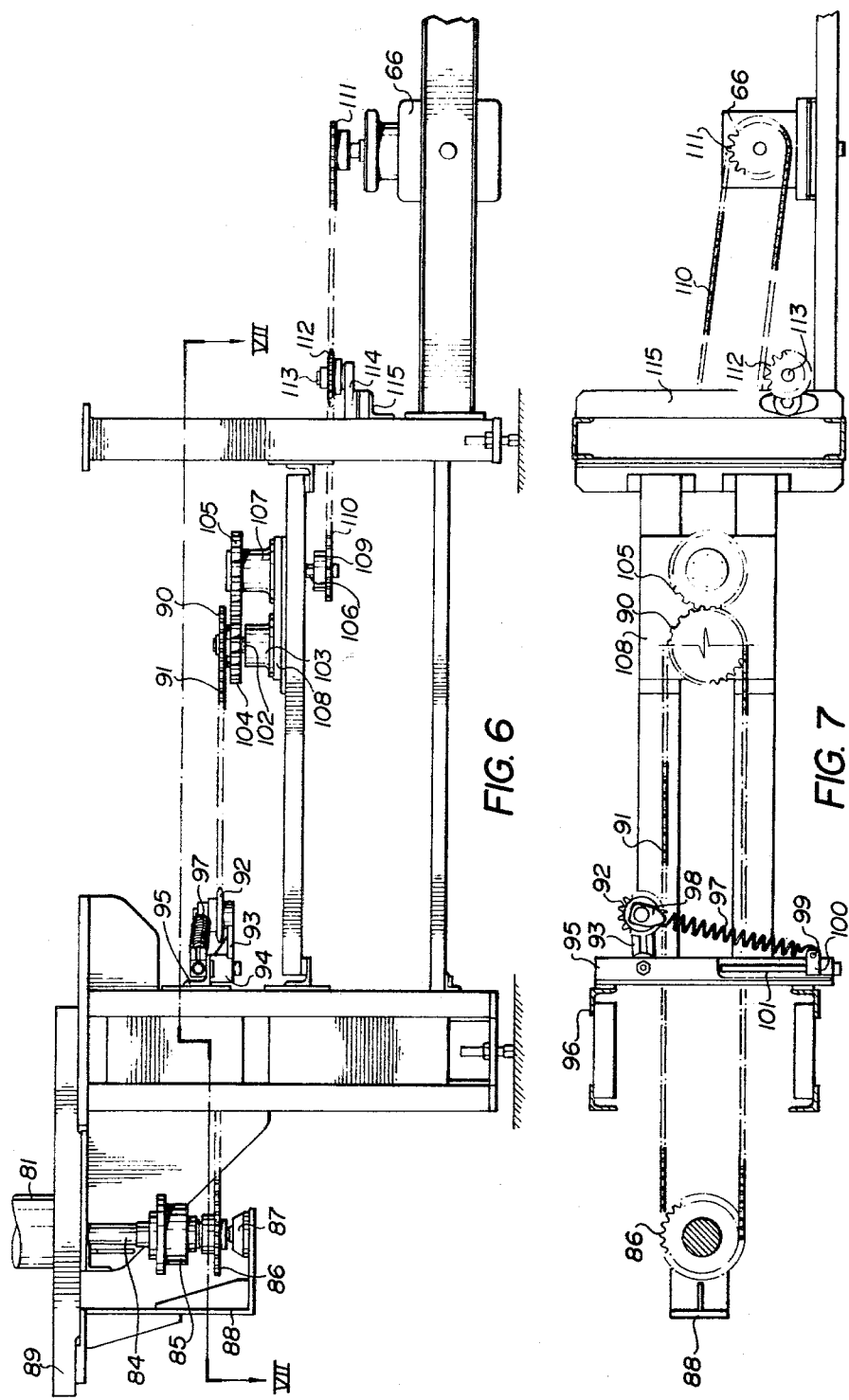

METHOD AND APPARATUS FOR SLUSH MOLDING ARTICLES OF FOOTWEAR

This is a division of application Ser. No. 925,842, filed July 18, 1978.

BACKGROUND OF THE INVENTION

1. Field of the Invention

This invention relates to a method and apparatus for filling a mold, and in particular to a method and apparatus for filling the heel cavity of a mold used in a slush molding machine for manufacturing articles of footwear.

2. Description of the Prior Art

The A. Cervinka Canadian Pat. Nos. 592,262 and 594,564, issued Feb. 9, 1960 and Mar. 15, 1960, respectively describe the production of calf-length boots using a slush molding process in which a mold in the shape of the boot is filled with a plastisol, e.g. polyvinyl chloride, the mold is heated to cause the plastisol to gel and form a skin, excess plastisol is poured from the mold, and the mold is again heated to cure the plastisol.

As mentioned in applicant's Canadian Pat. No. 995,866, issued Aug. 31, 1976, when molding winter boots or the like with large heels, difficulties may be experienced in filling the heel cavity. It is necessary to fill the heel cavity exactly; otherwise, the finished product is uncomfortable to the point of being useless. Canadian Pat. No. 955,866 describes an automatic heel filling device which includes a dispenser mounted on the molding machine and capable of travelling with the mold for filling the heel cavity. The device utilizes a heat-hardenable plastisol, which fills the heel cavity and is cured with the skin.

It has been found that the use of the slush molding method and machine described above with a heat-hardenable plastisol results in a large quantity of waste. Following formation of the skin, the top of the skin is removed by cutting to form a straight top edge of the boot. The excess skin is discarded as waste, and the skin is further processed, i.e. provided with a liner and otherwise finished to provide a boot. With a continuous slush molding process, large quantities of thermo-plastic material are discarded as waste. Moreover, it is necessary to provide a separate plastisol for filling the heel.

Accordingly, a method and apparatus which utilize such waste thermo-plastic material have obvious advantages. It has been found that in order to re-use the waste thermo-plastic material, it must be made liquid and remain in liquid form until it is dispensed into the heel cavity of the mold. Liquification is achieved into the heel cavity of the mold. Liquification is achieved by grinding the waste thermo-plastic material, possibly mixing it with a stabilizer and heating the resulting mixture to form a flowable thermoplastic mass. Once the mixture has been heated, it must remain heated until it is dispensed into the mold. Thus, the heel filling device described in Canadian Pat. No. 995,866 cannot be used to fill heel cavities with the thermoplastic mass, since the mixture would cool during the passage to the mold.

The object of the present invention is to provide a method and apparatus which permit the use of waste plastisol for filling the heel cavity in a slush molding process.

SUMMARY OF THE INVENTION

Accordingly, the present invention relates to a method of slush molding articles of footwear including heel and upper portions, including the steps of continuously conveying a plurality of molds along a path of travel; filling each mold with a plastisol; heating said molds to cure a portion of said plastisol, thereby forming a plastisol skin on the interior of the mold; discharging excess plastisol from the mold while leaving the skin the mold; filling the heel portion of said skin with a plastic material; and curing the heel portion, the improvement comprising using a thermoplastic material for filling the heel portion of said skin.

More specifically, recycled, waste thermoplastic material such as that obtained by trimming excess portions of the skin formed during the slush molding process is used to form the heel of the article of footwear. By recycled is meant waste material which is treated to make it usable in the process of the present invention, and the term "thermoplastic" is intended to mean a plastic which is hardened by cooling.

A typical composition for use in the slush molding process to form the skin of a shoe or boot includes a resin such as polyvinyl chloride, a plasticizer such as dialkyl phthalate, a stabilizer such as a barium/cadmium/zinc complex and colour pigments. In some cases, it may be possible to re-grind waste skin composition and use it to fill heel cavities. However, when using such re-ground skin compositions, there are the dangers of deformation in large heel cavities and decomposition due to heating. Accordingly, it may be necessary to add additional resin, plasticizer and/or stabilizer to the re-ground skin composition.

The present invention also relates to an apparatus for filling heel cavities of footwear molds continuously moving along a rectilinear path of travel comprising a stationary frame adjacent to said path of travel; a carriage slidably mounted on said frame for movement towards and away from said path of travel; an injection unit rotatably mounted on said carriage for movement with the carriage towards and away from said path of travel; nozzle means on the discharge end of said injection unit for dispensing thermoplastic material into the heel cavity of a mold; first drive means for moving said injection unit in synchronism with a mold in the direction of said path of travel; and cam means engageable by said injection unit for causing the nozzle to follow the rectilinear path of travel of said mold.

Because the barrel of the injection unit is heated for melting the thermoplastic material, the injection unit must be in continuous use, i.e. a shot of thermoplastic material must be discharged from the unit at frequent intervals. Otherwise, the injectable thermoplastic would be overheated and become scorched and degraded. The molds are normally spaced equidistant apart on carriers connected to a continuously moving chain. However, there are occasions when there is no mold on a mold carrier, and, on such occasions, the injection unit is automatically purged, the shot of thermoplastic material being dispensed into a waste receptacle located beneath the nozzle of the unit. The nozzle of the injection unit can either move in synchronism with a mold or move away from the path of travel of the molds for manual purging or servicing, or remain stationary and be purged when no mold is present.

Using the method and apparatus of the present invention in the production of articles of footwear with large heels, there is substantial reduction in production time. Since the heel material is thermoplastic, it must be cooled to harden. Thus, the shorter the time in the heaters for curing the plastisol of the skin, the quicker the hardening of the heel. With a plastisol heel, a relatively lengthy heating or curing time is required, while the thermoplastic material can be passed through the heaters quickly. Because no heat is required for curing the heel, the use of a thermoplastic material results in a substantial saving of energy.

BRIEF DESCRIPTION OF THE DRAWINGS

FIG. 6 is an elevation view of an alternate form of drive mechanism for imparting rotary motion to the injection unit;

FIG. 7 is a cross-sectional view of the drive mechanism of FIG. 6 taken generally along line VII—VII of FIG. 6;

DESCRIPTION OF PREFERRED EMBODIMENT

APPARATUS

Figure 1:
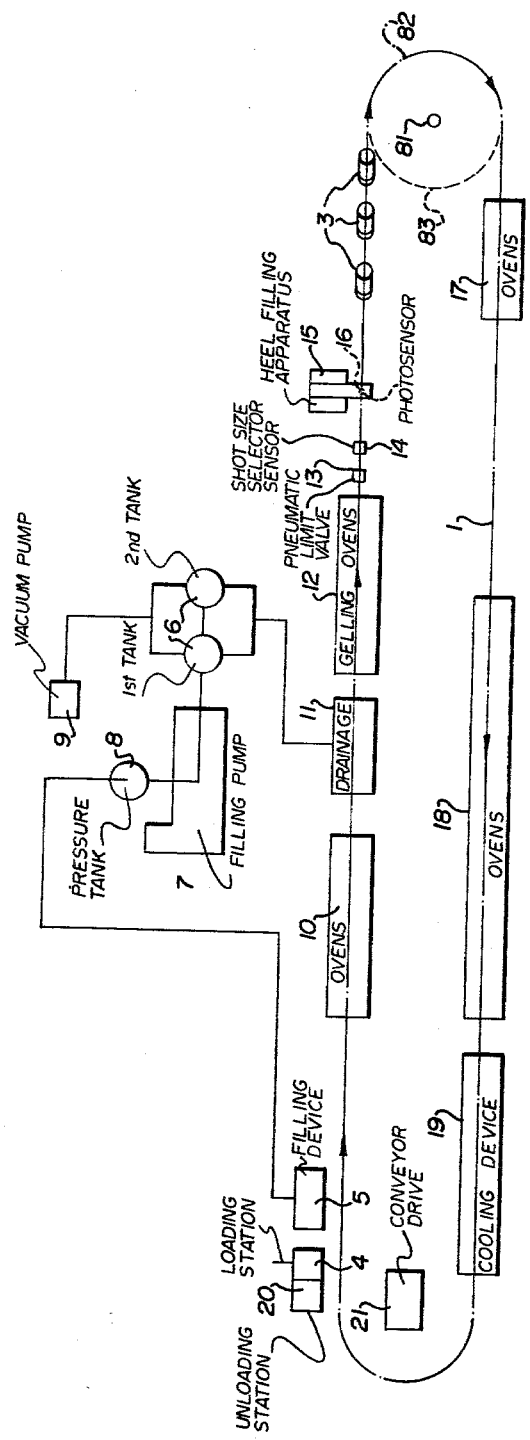
FIG. 1 is a schematic plan view of a slush molding machine incorporating the apparatus of the present invention.

With reference to FIG. 1, the apparatus of the present invention is intended for use with a slush molding machine including a conveyor in the form of a chain 1 carrying a plurality of carriers 2 (one shown in FIG. 2) spaced equidistant apart along the length of the chain. The chain 1 and carriers 2 normally follow a path of travel which is rectangular with semi-circular ends. Each of carriers 2 supports a mold 3 in the shape of a boot or shoe. In the slush molding process, the molds 3 are loaded onto the conveyor 1 at loading station 4, and each mold 3 is filled with plastisol such as polyvinyl chloride by a mold filling device 5. The plastisol is pumped from tanks 6 by a filling pump 7 and a pressure tank 8 to the filling device 5. A vacuum pump 9 is provided for deaerating the tanks 6 to prevent the formation of bubbles in the plastisol.

The filled molds 3 are carried by the conveyor 1 through a first bank of ovens 10 for partially curing the plastisol to form a skin on the inner surface of the molds. Excess plastisol is discharged from the molds by tilting them at a drainage location 11 and returned to the tanks 6 for re-use. The molds 3 with the skins therein are passed through gelling ovens 12 past a pneumatic limit valve 13 and a shot size selector sensor 14 described hereinafter, to a heel filling apparatus with the present invention and a photosensor 16 for detecting the presence of a mold 3. After filling of the heel cavity of the skin in each mold 3, the mold is conveyed through additional ovens 17 and 18 for curing the skin and sole thereof, respectively. Finally, the molds 3 pass through a cooling device 19 to an unloading station 20. The conveyor 1 is driven by a conveyor drive 21. At the unloading station 20, the skin is removed from the mold 3 for further processing, including trimming of excess plastisol. The excess plastisol is ground, if necessary, recycled and used in the heel filling apparatus 15 for filling heel cavities of molds.

Referring now to FIGS. 2 to 5, the apparatus of the present invention includes a fixed rectangular frame generally indicated at 22 mounted on the floor beside the conveyor 1. The frame 22 includes legs 23, sides 24, ends 25, longitudinal braces 26 and cross bars 27 near the bottoms of the legs. A cylindrical track 28 is mounted in corner brackets 29 on each side of the frame 22 for slidably supporting a carriage 30 for movement towards and away from the molding machine. The carriage 30 is in the form of a pair of rectangular blocks 31 joined together at their ends by plates 32, with arms 33 extending outwardly from each outside corner of the blocks. The tracks 28 extend through bushings mounted in apertures in the arms 33.

An injection unit 34 is rotatably supported on the carriage 30 by means of a large diameter, cylindrical shaft 35. The injection unit 34 is a conventional element with a cylinder 36 at the rear end thereof for driving a ram (not shown) which discharges plastic material from a hopper 37 through a heated cylinder 38 and a nozzle device generally indicated at 39 into the heel cavity of a mold 3.

Figure 3:
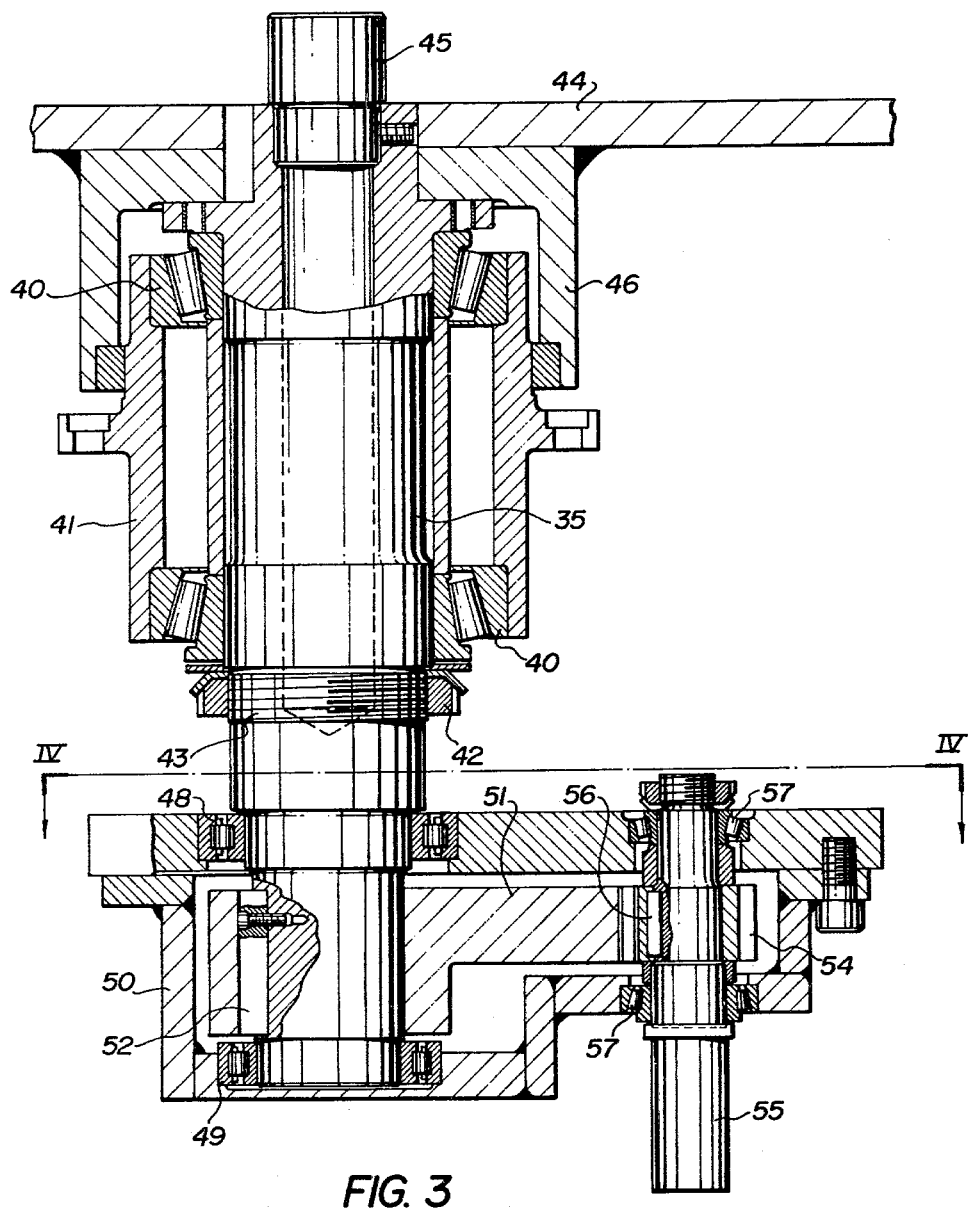
FIG. 3 is a longitudinal sectional view of a portion of a drive mechanism for imparting rotary motion to the injection unit.

With reference to FIG. 3, the shaft 35 is mounted in roller bearings 40 in a sleeve 41 in the centre of the carriage 30, the bearings 40 and the sleeve 41 being retained on the shaft 35 by a nut 42 on a threaded central portion 43 of the shaft. The injection unit 34 is mounted on a rectangular plate 44 and centered on the shaft 35 by a centering pin 45 extending upwardly from the shaft through the plate 44. A cap 46 is welded to the plate 44 and extends downwardly around the sleeve 41, being spaced therefrom by bushings 47. The bottom end of the shaft 35 is stepped, i.e. has reduced diameter lower portions, and is rotatably mounted in roller bearings 48 and 49 in a casing 50 connected to the bottom of the carriage 30.

The shaft 35, the cap 46, the plate 44 and the injection unit 34 are rotated by a gear quadrant 51 (FIGS. 3 and 4) secured on the bottom end of the shaft 35 in the casing 50. The gear quadrant 51 is keyed on the shaft 35 by a rectangular key 52. The teeth 53 (FIG. 4) of the gear quadrant 51 engage a pinion 54 securely mounted on a shaft 55 by a square key 56 in the casing 50. The shaft 55 is rotatably mounted in roller bearings 57 in the top and bottom of the casing 50, and extends downwardly out of the casing.

Figure 5:
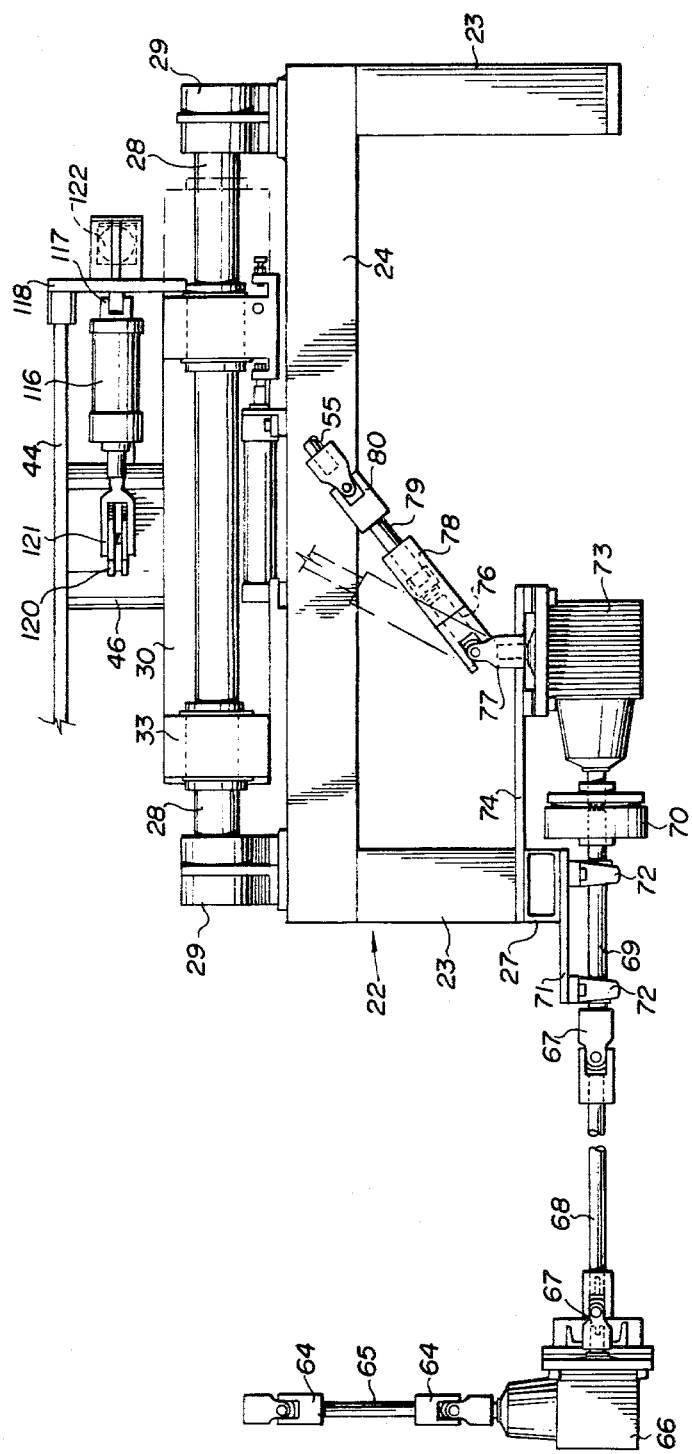
FIG. 5 is an elevation view of the remainder of the drive mechanism of FIG. 3.
Figure 8:
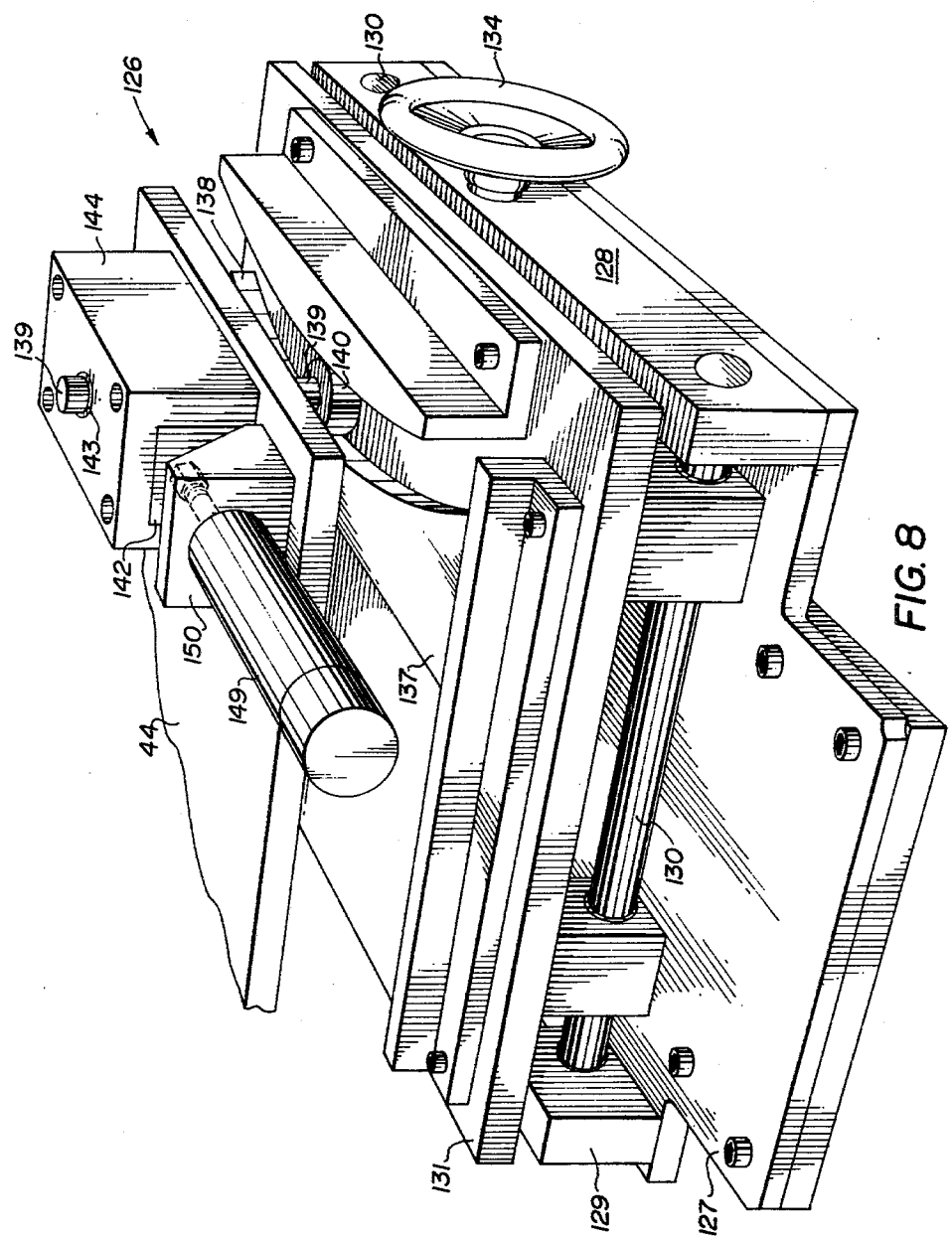
FIG. 8 is a perspective view of a cam device for causing the nozzle of the injection unit to follow a rectilinear path of travel.
Figure 9:
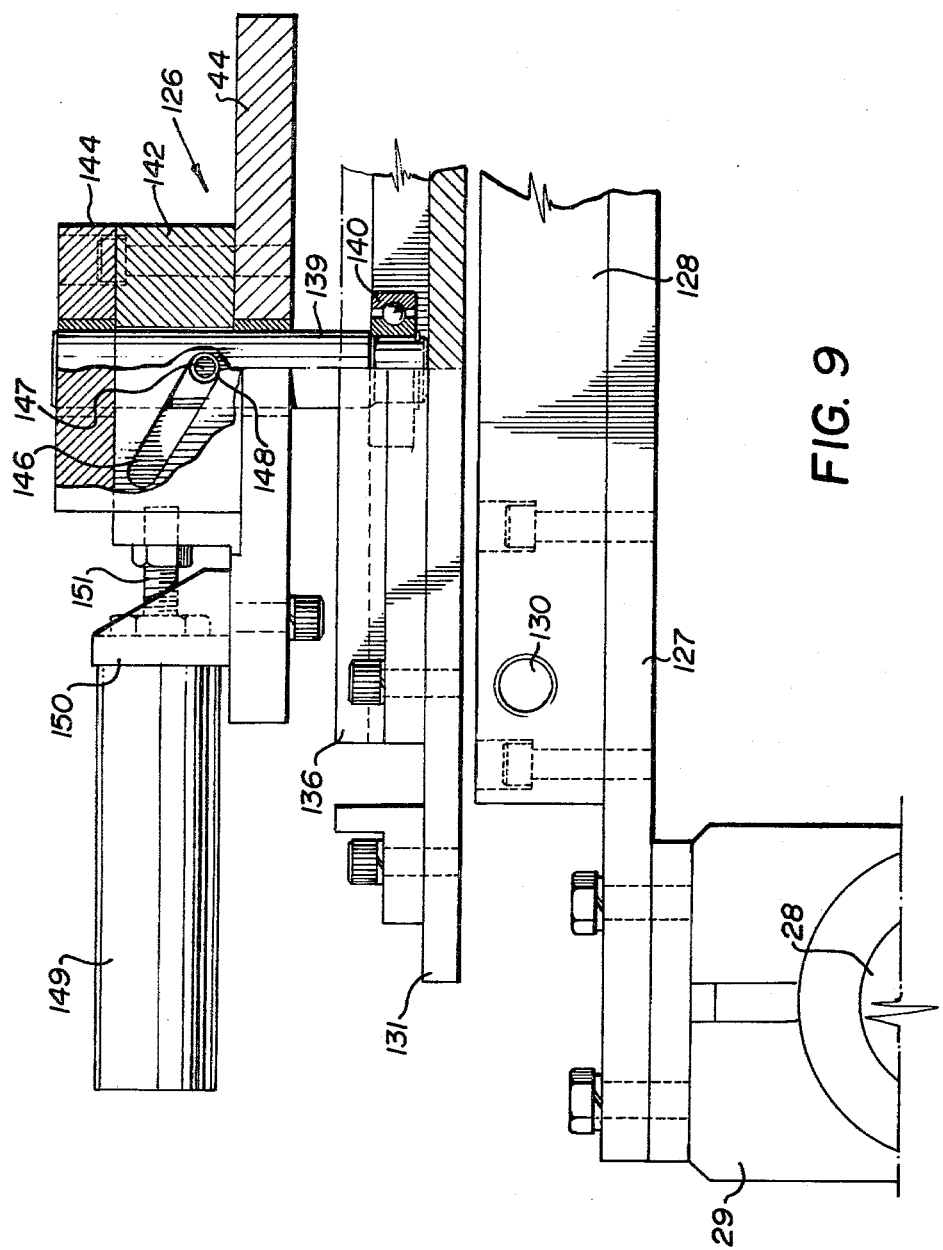
FIG. 9 is a partly sectioned front view of the cam device of FIG. 8.
Figure 10:
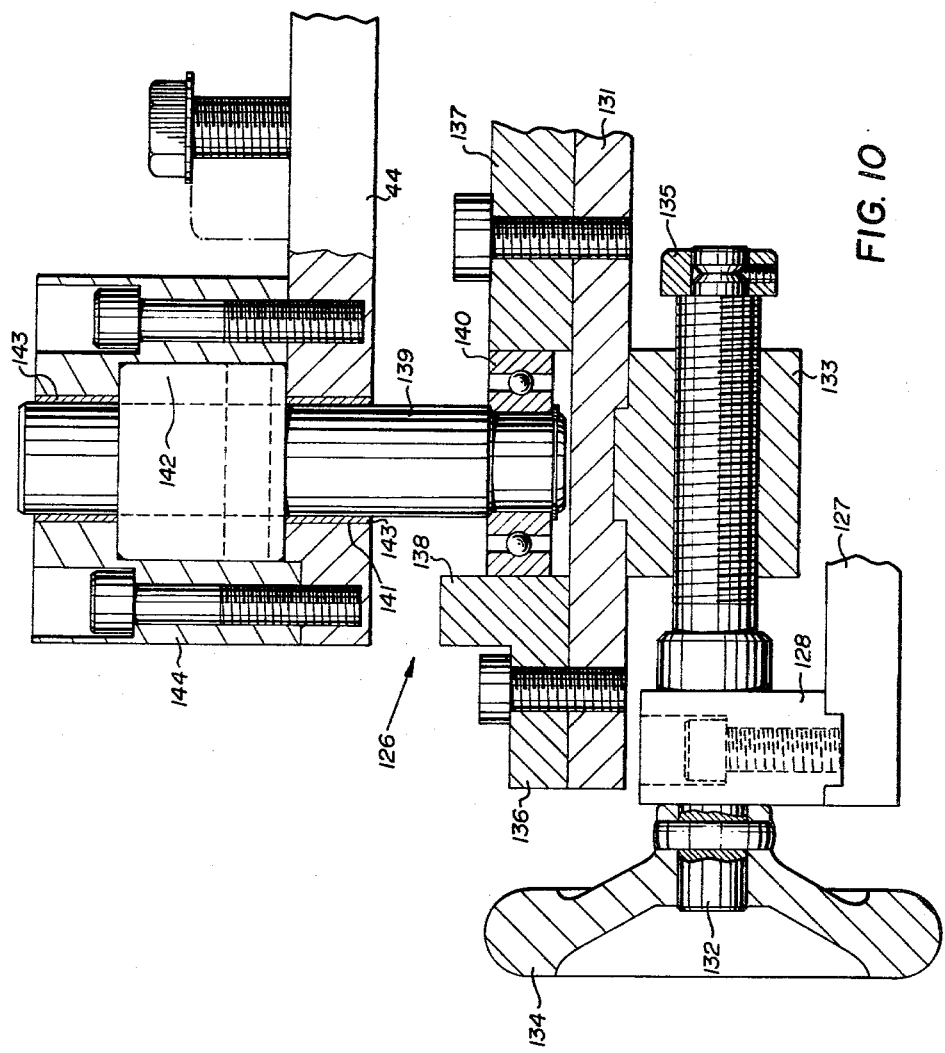
FIG. 10 is a cross-sectional view of the cam device of FIGS. 8 and 9.
Figure 11:
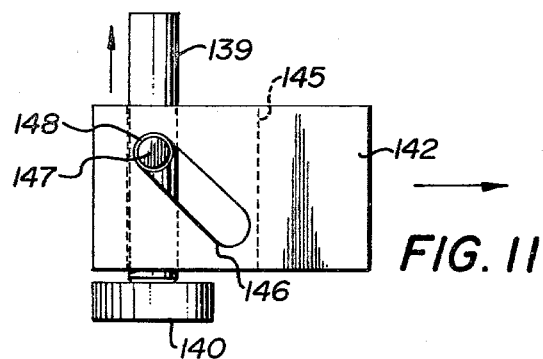
FIGS. 11 and 12 are schematic elevation views of roller and pin elements of the cam device of FIGS. 8 to 10.
Figure 12:
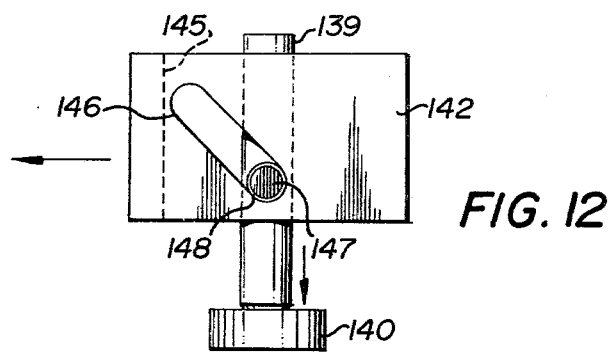
Figure 13:
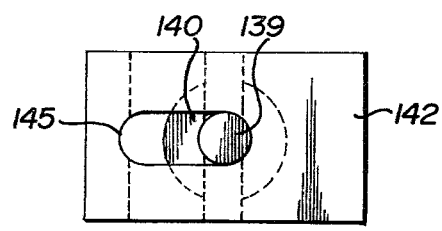
FIG. 13 is a schematic plan view of the elements of FIGS. 11 and 12.

In order to rotate the injection unit 34 in synchronism with a mold 3, the shaft 55 is driven by a drive train connected directly to the chain 1 for conveying mold carriers 2 and molds 3. The drive train (FIGS. 2 and 5)

includes a sprocket 58 rotatably mounted on a plate 59 on the molding machine frame in constant engagement with the chain 1. The sprocket 58 is mounted on a shaft 60 which also carries a gear 61 for driving a gear 62, which is also rotatably mounted on the plate 60. The gear 62 is mounted on the top end of a shaft 63 which is connected by universal joints 64 and a shaft 65 to a corner joint 66. The joint 66 is connected by universal joints 67, and shafts 68 and 69 to a clutch 70. The shaft is suspended from a plate 71 attached to the front cross bar 27 of the frame 22 by brackets 72.

Figure 2:
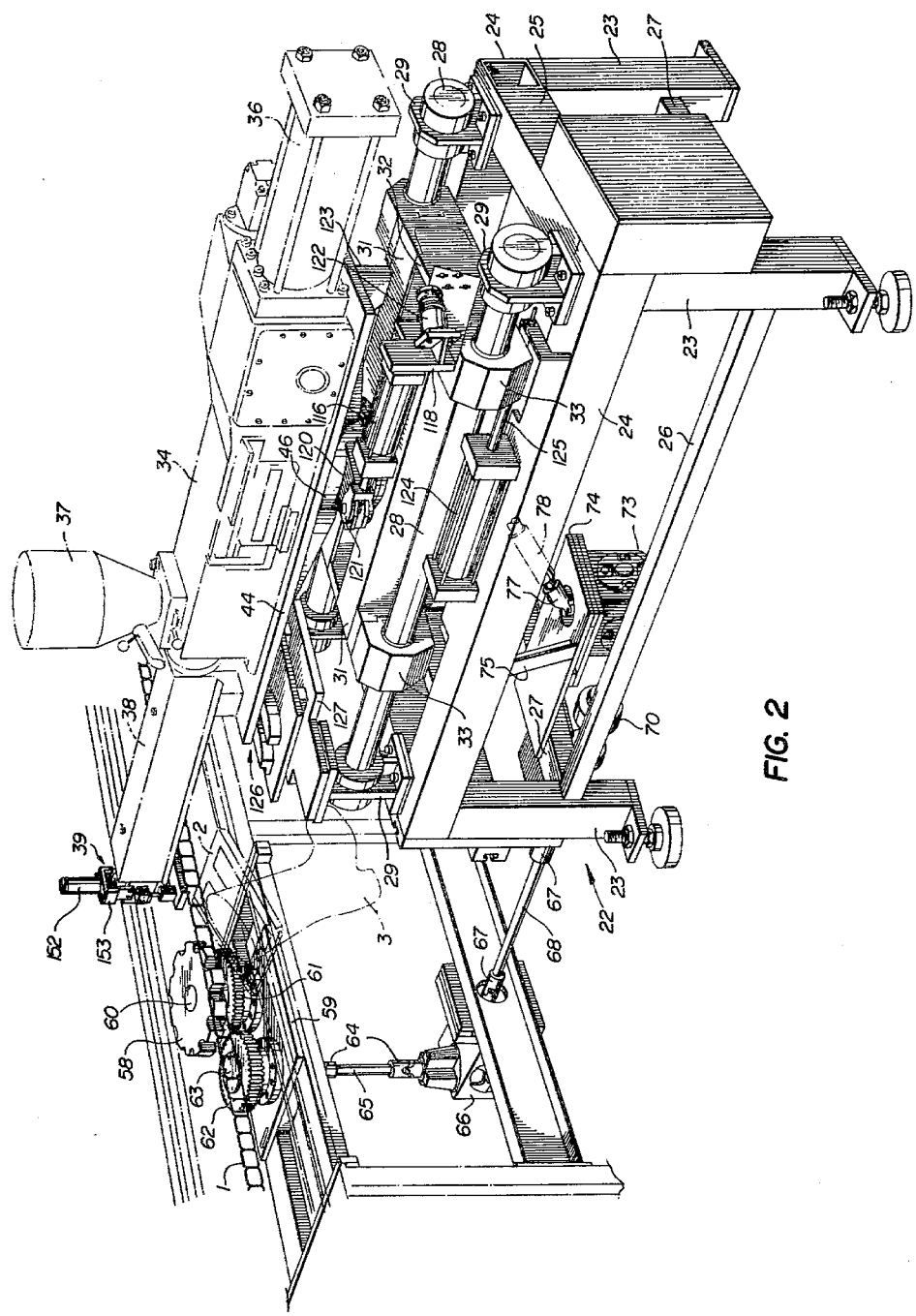
FIG. 2 is a perspective view of the apparatus in accordance with the present invention in position adjacent to a molding machine.

The clutch 70 is connected to a reduction gear 73, which is suspended from a plate 74 mounted on the front cross bar 27 of the frame 22 and connected to the frame side 24 by a diagonal brace 75 (FIG. 2). The reduction gear 73 is coupled to a shaft 76 extending upwardly from the plate 74 by a universal joint 77. The top end of the shaft 76 is fixed in a sleeve 78. A shaft 79 is slidably mounted in the top end of the sleeve 78 and is connected to the bottom end of the shaft 55 by a universal joint 80.

With reference to FIGS. 6 and 7, an alternate form of drive mechanism for imparting rotary motion to the injection unit 34 in synchronism with each mold 3 will now be described. Since the chain 1 may slip, it is preferable to connect the drive mechanism for the injection unit 34 to a main take up shaft 81 of the chain 1. The shaft 81 is at one end 82 (FIG. 1) of the molding machine for supporting a sprocket 83, the shaft 81 and sprocket 83 being freely rotatable. The chain 1 passes around the sprocket 83 at the end 82 of the molding machine opposite the conveyor drive 21.

Thus, the preferred drive train for rotating the injection unit 34 includes a reduced diameter bottom portion 84 of the shaft 81 (FIGS. 6 and 7), which is connected to a torque limiting overriding clutch 85 followed by a sprocket 86 mounted in a bearing 87. The bearing 87 is mounted on a bracket 88 connected to a part 89 of the molding machine frame. The sprocket 86 is connected to a sprocket 90 by a chain 91. The chain 91 is tensioned by a sprocket 92 mounted on the outer end of an arm 93. The inner end of the arm 93 is formed by a sleeve 94 pivotally mounted on a cross-bar 95 connected to uprights 96 of the molding machine frame. One end of a spring 97 is pivotally connected to the outer end of the arm 93 by a sleeve 98, and the other end of the spring is pivotally connected to a pin 99 in a block 100. The block 100 is slidably mounted in a slide 101 extending along the cross-bar 95 perpendicular to the chain 91 for adjusting the length of the spring 97, and thus varying the tensioning pressure of the sprocket 92 on the chain 91.

Figure 4:
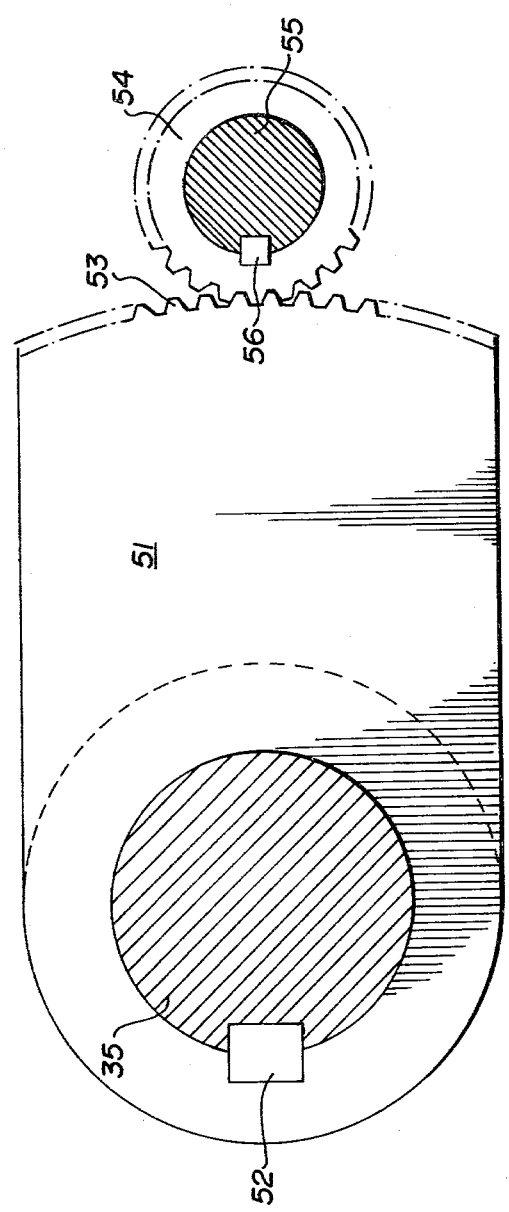
FIG. 4 is a cross-sectional view taken generally along line IV—IV of FIG. 3.

The sprocket 90 is fixed mounted on the top end of a shaft 102 in a bearing 103. A gear 104 is also mounted on the shaft 102 in permanent engagement with a gear 105 mounted on the top end of a shaft 106 extending downwardly through a bearing 107 and a plate 108, which supports both of the bearings 103 and 107. A sprocket 109 mounted on the bottom end of the shaft 106 is connected by a roller chain 110 and sprocket 111 to the corner joint 66 (FIG. 2). The chain 110 is tensioned by a sprocket 112 rotatably mounted on a stub axle 113. The axle 113 is mounted on the outer end of an arm 114, which is pivotally mounted on a cross-bar 115. The arm 114 is fixed in one position, but can be rotated to adjust the tension on the chain 110. The remainder of the drive mechanism for imparting rotary motion to the injection unit 34 is the same as illustrated in FIGS. 3 to 5 and described hereinbefore.

Thus, with either form of drive mechanism linear motion of the chain 1, carriers 2 and molds 3 is translated into rotary motion of the injection unit 34 and the shaft 35, rotation of the injection unit 34 being in unison with movement of the molds 3. When the clutch 70 is disengaged, the shaft 35 and the injection unit 34 are returned to the rest position by a pneumatic cylinder 116. The cylinder 116 is pivotally mounted by a clevis 117 on a frame 118 (FIG. 2) extending upwardly from the rear end of the carriage 30. A piston rod 119 extends from the front end of the cylinder 116 to a generally triangular arm 120 extending outwardly from the cap 46 on one side of the shaft 35. The piston rod 119 is pivotally connected to the bifurcated outer end of the arm 120 by a clevis 121.

The frame 118 also supports a shock absorber 122, which is engaged by an arm 123 extending downwardly from the plate 44 when the injection unit 34 is returned to the rest position by the cylinder 116. An additional cylinder 124 (one shown) is provided on each side 24 of the frame 22 for moving the carriage 30 and the injection unit 34 away from the molding machine for manual purging or servicing. A piston rod 125 extending rearwardly from each cylinder 124 is secured to a rear arm 33 of the carriage 30 for moving the carriage back and forth along the tracks 28.

With the above-described arrangement of elements, the nozzle device 39 on the end of the injection unit 34 would follow an arcuate path of travel, while the molds 3 follow a rectilinear path of travel parallel to the chain 1. In order to cause the nozzle device 39 to follow the same rectilinear path of travel as the molds 3, a cam device generally indicated at 126 (FIGS. 2 and 8 to 13) is provided at the front end of the plate 44 carrying the injection unit 34.

The cam device 126 includes a base plate 127 mounted on the brackets 29 at the front end of the frame 22. The base plate 127 supports a vertical front plate 128 and rear posts 129 with tracks in the form of rods 130 extending therebetween. A carriage 131 is slidably supported on the rods 130. The carriage 131 is fixed in one position, which can be changed by means of an adjustment screw 132 extending through the front plate 128 and threaded into a block 133 (FIG. 10) extending downwardly from the front end of the carriage 131. The outer end of the screw 132 is provided with a handle 134, and the inner end with a stop 135.

Top plates 136 and 137 on the carriage 131 with opposed arcuate surfaces define a cam track in the form of an arcuate cam groove 138 of rectangular cross-sectional configuration. A cam follower defined by a pin 139 with a roller 140 on the bottom end thereof extends downwardly into the groove 138 through an opening 141 in the plate 44 carrying the injection unit 34. During use, the roller 140 rides in the groove 138 while the nozzle is advancing with a mold 3, i.e. during filling of the heel cavity.

In order to retract the injection unit 34 for manual purging or shut down, the roller 140 is raised so that it is completely free of the groove 138. For such purpose, the pin 139 extends upwardly through a rectangular parallelepipedic block 142. Bushings 143 are provided on the pin 139 so that the pin can slide in the block 142 and in an inverter U-shaped frame 144, which is mounted on the plate 44 and surrounds the top and sides of the block 142. The frame 144 has an opening in the top for the pin 139. The block 142 is provided with a longitudinally extending, vertical slot 145 in its top for the pin 139, and with an inclined slot 146 in each of its sides for arms 147 extending outwardly from each side of the pin, perpendicular thereto. Rollers 148 on the arms 147 facilitate movement of the arms in the slot 146.

A cylinder 149 is mounted on a bracket 150 on the plate 44. A piston rod 151 extends outwardly from the cylinder 149 to one end of the block 142. When the piston rod 151 is extended (FIGS. 8, 9 and 12), the pin 139 and roller 140 are in their lowermost position with the roller 140 in the cam groove 138, and, when the piston rod 151 is retracted (FIG. 11), the arms 147 ride up the inclined slots 146, moving the roller 140 upwardly with the pin 139 out of the cam groove 138. Thus, the injection unit 34 and the plate 44 are released from the cam device 126, and are free to follow an arcuate path of travel when they rotate with the shaft 35.

An injection unit of the type normally used with the apparatus of the present invention is an off the shelf item, with a nozzle at the discharge end aligned with the longitudinal axis of the casing of the injection unit. In the present case, the plastic material is not being injected horizontally directly into a mold, but must descend at a right angle to the longitudinal axis of the injection unit. Accordingly, the nozzle device 39 provided on the front end of the injection unit 34 has been designed specifically for the apparatus of the present invention.

Figure 14:
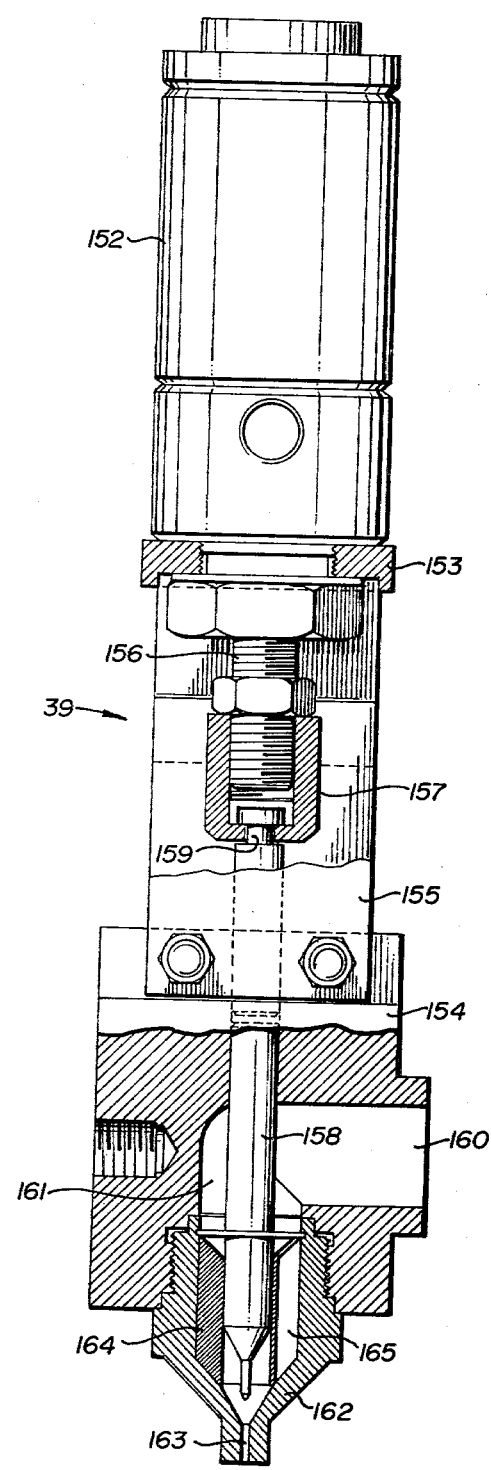
FIG. 14 is a partly sectioned, elevation view of a nozzle device used on the injection unit of FIG. 2.

Referring to FIG. 14, the nozzle device 39 includes a pneumatic cylinder 152 mounted on a bracket 153 (FIGS. 2 and 14) at the front end of the injection unit 34). A casing 154 is mounted between downwardly extending arms 155 of the bracket 153. A threaded piston rod 156 extends downwardly from the cylinder 152 for receiving a cup-shaped coupler 157, which connects the piston rod 156 to a plunger 158. The coupler 157 has a closed bottom end with a slot for receiving a reduced diameter portion 159 of the plunger 158. An inlet duct 160 is provided in one side of the casing 154 near the bottom end thereof for introducing material into a vertical passage 161. The bottom end of the passage 161 is closed by a nozzle 162, which includes a small diameter outlet orifice 163 and a cylindrical guide 164 for the plunger 158. One side of the guide 164 is provided with a vertical passage 165 for material dispensed by the nozzle device.

OPERATION

The apparatus of the present invention is intended for use with the shot size selector device disclosed in applicant's copending Canadian patent application Ser. No. 277,382, filed May 2, 1977. The shot size selector sensor 14 will operate in conjunction with an indicator (not shown) on the mold carrier 2 to dispense a quantity of heel filling material dependent upon the volume of the heel cavity. However, the shot size selector device does not form part of the present invention.

In order to operate effectively, it is merely necessary to provide a pair of switches (not shown) for closing by the mold carrier 2 and heel of each mold 3, respectively. Since it is essential that a shot of plastic material be dispensed at regular intervals, in the absence of a mold 3, closing of the switch actuated by the mold carrier 2 only would result in a purging step, i.e. a shot of thermoplastic material would be discharged between the carrier forks into a receptacle beneath the mold conveyor.

If a mold 3 is present, both switches are closed to start a heel filling operation. The clutch 70 is engaged to cause the nozzle device 39 to move in unison with the mold 3. As the injection unit 34 rotates on the plate 44 and the shaft 35, the cam device 126 causes the carriage 30 with the injection unit 34, shaft 35 and plate 44 to move away from the conveyor chain 1 as the roller 140 moves to the midpoint of its path of travel in the cam groove 138, and then towards the chain 1 as the roller 140 moves past the midpoint of the cam groove 138. Thus, instead of following an arcuate path overlapping the straight line path of travel of each mold 3, the nozzle device 39 is caused to follow a straight line path of travel above each mold 3. During movement of the nozzle device 39 with the mold, a very low pressure may be applied to the piston rod end of the cylinder 116 to assist movement of the plate 44 and injection unit 34.

During movement of the nozzle device 39 with the mold 3, thermoplastic material is dispensed via the nozzle 162 into the heel cavity of the mold 3. The degree and duration of opening of the nozzle 162 are controlled according to the size of the heel cavity using a timer (not shown) pre-set to match the heel size. As soon as the mold carrier 2 strikes a third switch (not shown) the injection unit 34 and the nozzle device 39 are returned to their initial positions upstream in the path of travel of the chain 1 (to the right in FIG. 2) ready for another heel filling operation.

With the apparatus illustrated in FIG. 1, each mold carrier 2 first actuates the pneumatic limit switch or valve 13, which moves the shot size selector sensor 14 into engagement with cams on each mold carrier 2 to feed a signal to the shot size control indicative of the volume of material to be dispensed into the heel cavity of the mold 3. The cams on each mold carrier 2 are pre-set in accordance with the size of the heel cavity by an operator at a location immediately following the cooling device 19. Then, the photosensor 16 located beneath the nozzle device 39 of the injection unit 34 is occluded by the heel of the mold 3 to energize the clutch 70 which starts movement of the injection unit 34 with the mold 3.

Four switches (not shown) are located beneath the rear or outer end of the injection unit 34 for actuation by a magnet mounted on the bottom of the plate 44. The first switch indicates the rest position of the injection unit 34. The second swtich indicates heel filling, i.e. opens the nozzle 161 and starts injection. The heel filling step is terminated by the shot size control of the shot size sensing device. The third switch acts as a safety switch to terminate injection in the event that the shot size control is defective, and disengages the clutch 70 to permit the injection unit 34 to return to the rest position. The fourth switch is a safety switch override for the third switch, i.e. in the event of malfunctioning of the third switch to effect the same operations as the third switch.

At the end of a heel filling operation, in order to return the injection unit 34 and the nozzle device 39 rapidly to their initial position the cylinder 116 is actuated to swing the shaft 35, injection unit 34 and nozzle device 39 to such initial position. Rapid return of the heavy injection unit 34 is cushioned by the shock absorber 122, which is engaged by the arm 123 on the plate 44. During return of the injection unit 34 to the initial position, the roller 140 remains in the cam groove 138.

For manual purging or servicing, the cam follower, i.e. the roller 140 is retracted from the cam groove 138 to free the plate 44, and the cylinders 124 are actuated to move the carriage 30, injection unit 34 and nozzle device 39 away from the chain 1 of the molding machine.

We claim:

1. An apparatus for filling the heel cavities of footwear molds moving continuously along a rectilinear path of travel comprising a stationary frame adjacent to said path of travel; a carriage slidably mounted on said frame for movement towards and away from said path of travel; an injection unit rotatably mounted on said carriage for movement with the carriage towards and away from said path of travel; nozzle means on the discharge end of said injection unit for dispensing thermoplastic material into the heel cavity of a mold; first drive means for rotating said injection unit in synchronism with a mold during a heel filling operation; a shaft for rotating the injection unit; and cam means engageable by said injection unit for causing the carriage to move towards and away from said path of travel, wherein the first drive means includes a drive train connected at one end to a conveyor and at the other end to said shaft, whereby the nozzle means moves in a straight line path of travel over a mold during the heel filling operation.

2. An apparatus according to claim 1, wherein said molds are carried along said rectilinear path of travel by a conveyor, said first drive means including a shaft rotatably supporting said injection unit, said drive train including a clutch for disengaging said shaft from said conveyor.

3. An apparatus according to claim 2, including second drive means connected to said shaft for rapidly returning said injection unit to an initial position at the end of a heel filling operation.

4. An apparatus according to claim 3, including third drive means for moving said carriage and injection unit away from said path of travel of the molds for purging.

5. An apparatus according to claim 1, wherein said cam means includes a cam track on said frame and a cam follower connected to said injection unit and engageable with said cam track for causing the carriage and injection unit to move towards and away from said path of travel during rotation of the shaft and injection unit by distances sufficient to change the path of travel of the nozzle from arcuate to a sraight line paralleling the path of travel of the molds.

* * * * *